United States Patent [19]

Fox et al.

[11] Patent Number: 4,727,588

[45] Date of Patent: Feb. 23, 1988

[54] SYSTEM FOR AUTOMATIC ADJUSTMENT AND EDITING OF HANDWRITTEN TEXT IMAGE

[75] Inventors: Abijah S. Fox, Hartsdale, N.Y.; Evon C. Greanias, Chevy Chase, Md.; Joonki Kim, White Plains; Charles C. Tappert, Ossining, both of N.Y.

[73] Assignee: International Business Machines Corporation, Armonk, N.Y.

[21] Appl. No.: 917,280

[22] Filed: Oct. 9, 1986

Related U.S. Application Data

[63] Continuation of Ser. No. 655,174, Sep. 27, 1984, abandoned.

[51] Int. Cl.[4] .............................................. G06K 9/22
[52] U.S. Cl. .......................................... 382/13; 382/9; 382/57; 340/724
[58] Field of Search .................. 178/18, 19, 21, 23 A; 340/707, 708, 724, 731; 382/9, 13, 57, 59

[56] References Cited

U.S. PATENT DOCUMENTS

| | | | |
|---|---|---|---|
| 3,111,646 | 11/1963 | Harmon | 382/9 |
| 3,133,266 | 5/1964 | Frishkopf | 382/13 |
| 3,712,443 | 1/1973 | Mathews | 340/724 |
| 4,440,513 | 4/1984 | Kataoka et al. | 178/18 |
| 4,475,239 | 10/1984 | Van Raamsdonk | 382/57 |

Primary Examiner—Leo H. Boudreau
Attorney, Agent, or Firm—Sughrue, Mion, Zinn, Macpeak, and Seas

[57] ABSTRACT

A system of information formatting and editing using handwritten input data on an all points addressable tablet. Input words are segmented then reformatted in a consistent manner of spacing and horizontal alignments to provide a legible output while still maintaining the handwritten format. Editing functions such as delete, add and move are provided in an interactive manner.

17 Claims, 7 Drawing Figures

SYSTEM FOR AUTOMATIC ADJUSTMENT AND EDITING OF HANDWRITTEN TEXT IMAGE

This is a continuation of Ser. No. 655,174, filed on Sept. 27, 1984, now abandoned.

BACKGROUND OF THE INVENTION

This invention relates to a system for providing full function electronic communication relative to hand prepared images such as handwriting and sketches together with key-entered text. In contemporary communications systems, a need exists to accommodate image communication as well as keyed in text. Such image communication, distinct from image identification, includes the capability of transmitting and receiving hand-prepared images. In the context of transmission, such a system must have the capability of providing for original creation of documents, annotation of existing documents, the completion by hand of various business forms and the rapid communication of short messages that may include hand drawn figures. This degree of functionality involves data formatting and editing.

Such systems must be "user friendly" in creating and editing images as well as in message transmission. Ideally, the creation of images should be done utilizing equipment providing users with the ability to capture and display hand drawn images, automatically adjust size and position of various image elements, and, alter the image utilizing easy to perform operations. Moreover, such equipment should be available to multiple users at convenient locations, such as at desk sites with hardware which is physically unobstrusive and can be operated utilizing simple procedures which do not interfere with the user's concentration on the substantive content of the task at hand.

In order to fulfill these requirements, without disturbing the users' concentration, a system methodology must be defined which allows for information entry and edit operations which are accomplished with at least the same ease as in physically creating the data. i.e., handwriting. This functionality includes text and image recording, selective editing such as erasing, insertion and the ability to change the order of the text by strokes of a pen-like device on paper or display.

Reference is made to U.S. Pat. Nos. 3,761,877 and 3,399,401. These patents broadly disclose the concept of employing a computer based graphic display system employing an X-Y input tablet together with a writing stylus and display on a CRT. In both patents, the computer employs circuitry for converting the data for purposes of display on the screen but does not provide any techniques for formatting such as segmentation, baseline drift correction, and editing. U.S. Pat. No. 3,761,877 discloses broadly the concept of character recognition; however, recognition per se is not a part of the present invention.

Consequently, while generalized concepts of employing an X-Y tablet for inputting data onto a CRT screen are known, there exists a requirement in the technology for a system which is capable of separating handwritten data into individual segments or words and treating such segments as a block of data material which can be formatted and edited. The formatted and edited data may be stored, transmitted or later displayed.

SUMMARY OF THE INVENTION

Given the deficiencies in present image communication processors, the present invention employs an electronic tablet and an all-points-addressable display to create handwritten images of documents which may be easily edited and then stored within an information processing system. The data may be subsequently transmitted to one or more recipients equipped with suitable all-points addressable displays. By utilizing editing and automatic formatting techniques, the representation of the image data in the system and in the output device is altered and presented in a more legible manner consistent with conventional text presentation. Examples of editing carried out by the present invention are deletion and insertion operations on data components. Examples of formatting are paragraph indentation, word separation, and baseline drift correction.

This invention will be described in greater detail by referring to the attached drawings and the description of the preferred embodiment that follows.

DESCRIPTION OF THE PREFERRED EMBODIMENT

In accordance with this invention, the input device is an electronic tablet utilizing apa (all points addressable) techniques to record handwritten images of documents which may be subsequently edited. Such tablets are known in this field, generally having either opaque or transparent screens. Such devices are high resolution input systems where every point is defined by a pair of coordinates. Coordinates are collected, generally at the rate of 100-200/second. The sampling rate employed in such apa systems is a function of anticipated movement of the stylus.

Such known electronic tablets have, in the past, been used for a variety of purposes. Typical are the preparation of engineering drawings of mechanical or electrical devices and for the recognition of handwritten characters to produce coded inputs for information processing. This invention does not deal with character recognition per se, such techniques being defined in, for example, U.S. Pat. No. 3,111,646, IBM Technical Disclosure Bulletin Vol., 24, No. 11A, pp 5404–5409, April 1982 and IBM Technical Disclosure Bulletin, Vol. 24, No. 6, pp 2897–2902, November 1981.

In accordance with the present invention, tablet signals are processed automatically to improve the image display of handwritten words and symbols.

Typical operations are identifying words as units of presentation for handwritten text, adjusting the interval between consecutive words and lines of text to provide uniform spacing, correcting skew lines of handwriting (baseline drift correction) and presenting handwritten text in paragraphs reflecting the shape the user has created on paper.

In accordance with known techniques, during data creation, signal are created utilizing tablet entry such that a series of digital values corresponding to the coordinates of successive positions are generated as the pen moves across the tablet surface under user control. Digital data is produced as pen movement occurs across the surface. Such is accomplished by means of frequent sampling and subsequent filtering in a manner designed to retain significant shape and location data.

The fundamental elements of such tablet input data are the X-Y coordinate pairs. These are combined to form a stroke, that is, substantive pen movement. A stroke is defined as a sequence of points between the pen initially striking the tablet in a downward motion and the pen being lifted up. These coordinate pairs form the basic units of tablet output which are subsequently processed. Pen strokes may be employed to perform various functions. These are typically information entry, command entry and operand identification. A menu point can be predefined such that information is entered by touching it when its coordinates are produced, the system is programmed to record a prescribed message. Alternatively, the image information can be entered by drawing it with the pen on the tablet. Commands can be entered by touching menu points or by making characteristic marks on the tablet. In order to sense these marks the system must be programmed to recognize them. If an image item is an operand for a command operation that is being performed, it can be identified by touching the item with the pen where it appears on the tablet. When the pen touches one or more points which fall within an image item, that item is identified for the operation. It is understood that known programming techniques are employed to create menu displays and processing logic operation in response to menu selection.

This invention provides logic to automatically process table entered images for detection of fundamental features of those images. Such images correspond to symbols, words, lines and paragraphs which make up a document image. The methodology of such logic is to compare each succeeding tablet signal with the signals that have preceded it. Points where the pen is lifted are detected and displacements between pen down and pen up are used to determine the limits of image features. Running values are retained by the system for feature extremeties and a baseline is estimated for text images. The position of each succeeding signal is then compared with preceding extremity information to determine where the previous word or line has ended and a new symbol has begun. By storing these points of segmentation with the recorded signals, boundaries and relative size of symbols, words and lines can be identified in the stored image data.

Once segmented, tablet image data is then employed to create images which have a more uniform separation between words and additionally fill the image display area effectively. In instances where words are written such that the characters are significantly larger than others in the document, they can be reduced to fill the space more effectively. As additional words are added to the written record, additional lines are appended to the image display. In situations where the added words are written directly following prior words on the tablet, new display lines will be a part of the same paragraph. In situations where: added words are indented and the prior line did not start a new paragraph, lines are skipped, or an added word does not fill a prior line, the output image will start as a new paragraph. These operations occur as a function of the formatting algorithms of this invention.

The segmented tablet image data is also used to correct baseline excursions which occur when the writer does not follow a horizontal line across the page. As is well known, handwriting often runs either "uphill" or "downhill", in either case a deviation from the horizontal. In accordance with this invention, an estimated baseline is determined for each line of words on the tablet. This invention allows for position adjustment in both the displacement and rotational orientations with respect to the baseline. The formatting methodology of this invention accomplishes these tasks.

Editing of handwritten text which is retained in noncoded form is another application of segmented tablet image data. Editing operations include the ability to delete, replace, insert or move portions of noncoded test in a handwritten page. These functions can be initiated, in accordance with this invention, by utilizing the pen to touch a menu point whereby identification of the action to be taken occurs. This is then followed by touching with the pen the text locations where the action is to occur.

Figures 1, 2, 3:
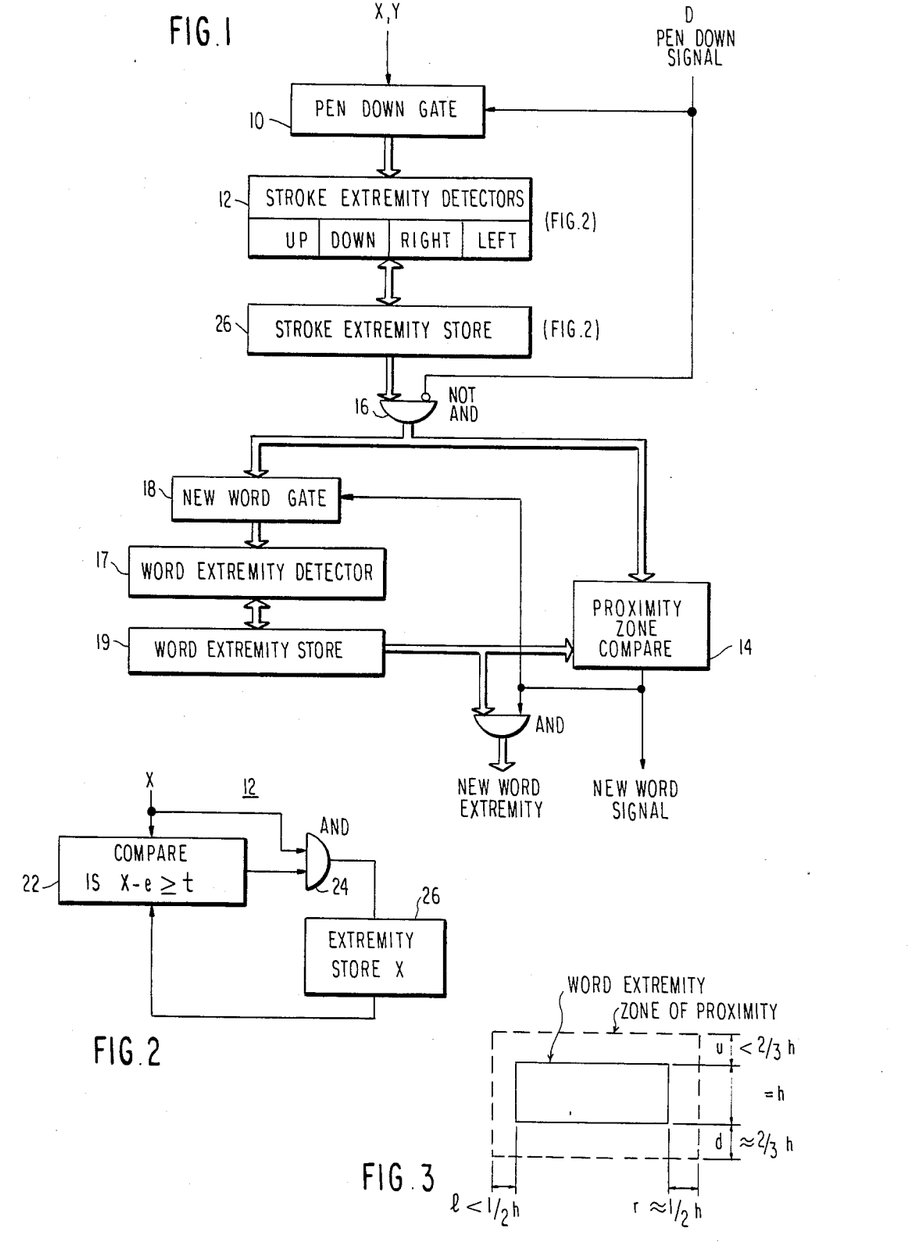
FIG. 1 is a functional block diagram showing the procedure for segmenting uncoded information into component word images.
FIG. 2 is a schematic diagram showing the technique of storing extremity information as a part of the word segmentation techniques of FIG. 1.
FIG. 3 is an illustration showing segmentation within a zone of proximity employing a parallelogram as the zone definition.

Referring now to FIG. 1, a schematic diagram of the technique for segmenting noncoded information (NCI) line images is depicted. X and Y signals from the writing tablet indicate the current position of the pen on the tablet given the all points addressable nature of the system. The D input signal indicates when the pen touches the tablet. As shown in FIG. 1, the beginning of each NCI segment is initiated by a pen down signal, that is, the initiation of a "D" signal to gate 10. While the pen is down, and in contact with the tablet, X and Y signals are generated and passed to stroke extremity detectors 12 (see FIG. 2). Four stroke extremity detectors are employed. One is for determining left extremity, a second for right extremity, a third for upward extremity and a fourth for downward extremity. The X and Y signals from the tablet are passed to all of these detectors and appropriately stored.

Referring to FIG. 2, a schematic diagram of one such extremity detector is illustrated. The example shown is for a right extremity detector, it being understood that the remaining three operate functionally in this same manner. As each new point occurs, its X and Y coordinates are compared with those previously stored which have been determined to be extreme values. In this case only X values are considered. If the X value exceeds the stored, predetermined right extreme value by a predetermined threshold (t) thus indicating movement to the right, a new extreme value is detected. The threshold (t) is employed to accommodate for pen jitter. Thus, as shown in FIG. 2, the input X signal is first subject to a comparison 22 to determine whether it is greater than the current extreme value (e) by a predetermined amount, that is, is it greater or equal to the threshold (t). If the indication is positive, the X value is gated to the AND gate 24 shown in FIG. 2 and stored in register 26 as a new extremity value of X. Subsequent X values are compared and updated with the newly stored right extreme value.

In a compatible manner, extreme values of (−X, +Y and −Y) are compared with a threshold and extreme values are stored.

Referring back to FIG. 1, whenever an end of stroke is detected as a function of pen lift, that is movement of the pen off the tablet, the value stored in each of the stroke extremity storage registers 26 are passed to a proximity zone compare system 14 through gate 16. Stroke extremities are compared with prior word extremities to test whether the new stroke lies outside the proximity zone and therefore a new word is begun. When a new word is begun a new word signal is generated clearing new word gate 18 to pass extremity values for the new word. When the old word is continued, stroke extremity values are passed to the word extremity detector 17 utilizing gate logic such as shown in FIG. 2. Updated extreme values for the old word are then stored in the word extremity store 19 shown in FIG. 1. When a new word has begun, the word extremity store is erased and extremities of the first stroke of the new word are then passed from the word extremity detector to the word extremity store 19.

As illustrated in FIG. 1, the proximity zone compare 14 is used to determine the beginning of new words for purposes of defining a zone of proximity for each word that is being segmented. The zone of proximity may have any arbitrary shape, however, a parallelogram is the easiest to implement. An example of a suitable parallelogram shown in FIG. 3, is a rectangle. Each new stroke is compared with the zone of proximity of the current word. If any part of the stroke falls inside the zone, it is considered to be part of the current word being generated. If it does not fall within the zone, it is considered to be either the beginning of a new work or the continuation of a word previously thought to be completed.

FIG. 3 illustrates segmentation utilizing a rectangular proximity zone. It should be understood that any parallelogram may be employed. In some alphabets or in cases where letters are slanted a different zone shape may be used. The rectangular zone illustrated in FIG. 3 is defined by horizontal lines passing through the upper and lower extremities and vertical lines that pass through the left and right extremities. A new word is detected when a stroke occurs outside the proximity zones of preceding words. The new word strokes must be positioned more than a prescribed threshold distance (denoted herein as "r") beyond the previously stored exteme right position or beyond the stored exteme left threshold distance (denoted herein as "l"). In a corresponding manner, new word strokes must be positioned relative to previously stored up and down threshold distances (denoted herein as "u" for extreme upward position, and "d" for extreme downward position). The values of these prescribed thresholds "r", "l", "u" and "d" are based on selected characteristics of the NCI images.

As shown in FIG. 3, "h" is denoted as the height of handwriting. It may be assumed for English handwriting that "r" is approximately 0.5 of "h" while "l" is slightly less than 0.5 because handwriting progresses from left to right under normal conditions. Similarly, "d" can be established by inspection to be approximately 0.667 of "h" while "u" is slightly less than 0.667 of "h". These threshold values must be adjusted when different languages are employed. That is, the values described herein are usable for English language handwriting, however, if other languages are employed; then the parameters would have to be suitably adjusted.

In addition to this technique of word segmentation, such can also be initiated by the occurrence of prescribed external events. As indicated, segmentation is a function of spatial relationships which in turn are a function of the language employed. Segmentation is not necessarily time limited, however, it can be determined based on the passage of time in which no additional strokes are made. Thus by time monitoring the occurrence of D signals, segmentation of data into assumed words may occur. Segmentation could also occur by having the writer touch a menu point entry when a word is complete. This latter technique, while assuring positive segmentation, slows down data entry.

Word segmentation as illustrated relative to FIGS. 1-3 could occur on one line of data at a time. If enough processing memory was available, conceivably the entire tablet could be segmented after it has been filled.

After the NCI images have been segmented into defined areas representing words, they may be assembled with prescribed formatting rules to form documents that can be presented as useful display images, transmitted, or, printed out. Each document is developed as a collection of words that form one or more paragraphs. Formatting rules thus serve to determine the position of each segmented word in the shape of a paragraph in the document.

The occurrence of a new word may require that it be placed at the beginning of a new paragraph, appended to the end of an old paragraph or, in some situations, inserted within the paragraph. When a word is appended at the end of a paragraph, or inserted into the middle, its closest upstream word in the document image is found and the new word is placed immediately following it. When the word is the first word of a new paragraph, in accordance with the formatting instructions of this invention, it is placed at the beginning of the new line, with indentation if the tablet paragraphs are indented.

In order to apply these formatting rules, logic must detect the occurrence of new paragraphs. If a word is the first word of a document then it is by definition the beginning of a new paragraph. If a word is the first word of a line that is not the first line of the document it may be a new paragraph or simply the continuation of the preceding paragraph. A new paragraph is generally detected when the word is indented, outdented or is placed well below the prior line, which has not already been determined to be a paragraph's first line, or alternatively, at the beginning of a new line when the previous line space was not filled. Any of these three occurrences can be used to trigger a paragraph start.

With the words and paragraphs that make up a document detected, document content may then be mapped into an image for display or print-out. To produce the desired output, this invention provides an algorithm to fill the available space on each line with properly spaced words until all words of the paragraph have been used. It may be necessary to fill out lines with words from a subsequent line on the tablet and at other times it may be necessary to spill extra words from the end of one tablet line into the following lines for purposes of display. Again, it is noted that this invention makes no attempt to recognize the substantive content of the words being formatted.

Figure 4:
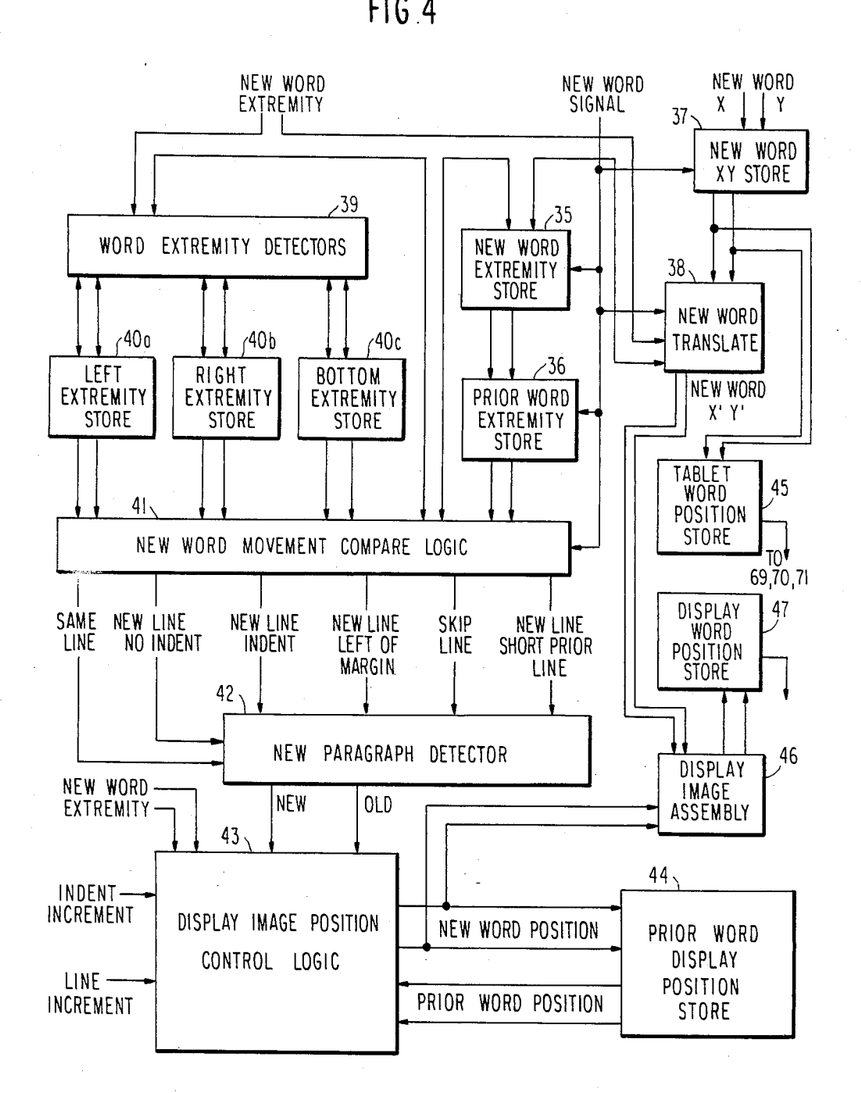
FIG. 4 is a schematic block diagram of the logic for positioning uncoded words in the display image.

Referring now to FIG. 4, the logic for positioning NCI words in the display image is illustrated in a schematic diagram. The inputs to this logic comprise: the new word signal of FIG. 1; x and y coordinates of the new word obtained from Pen Down Gate 10 of FIG. 1; and the new word extremity values from FIG. 1. After the new word signal occurs for the preceding word, the new word's x and y coordinates are stored in the New Word XY Store 37. As each succeeding new word signal occurs, the contents of New Word XY Store 37 are passed into Tablet Word Position Store 45, where the signals of each word are recorded with a document word sequence number which is used for subsequent image editing operations to be described later.

The New Word Translate Unit 38 also receives new word extremities of x and y from the Word Extremity Store 19 of FIG. 1. The New Word Translate unit 38, which is connected to New Word XY Store 37, subtracts the minimum value of x from the x coordinates of the new word and the minimum value of y from the coordinates of the new word in order to produce a new word representation in X' and Y' with its origin at the bottom left corner of the new word.

New word extremities are also passed to the Word Extremity Detector 39, which compares the new word extremities with previously stored left, right and bottom extremities of the preceding words of the document. If a new word extremity exceeds the previously stored corresponding extremity, the new value is stored in Extremity Store 40a, 40b or 40c when the subsequent new word signal occurs. Until then prior values are stored in 40a, 40b, and 40c.

New word extremity values are also passed into the New Extremity Store 35. The extremity values are held in New Word Extremity Store 35 until the next new word signal occurs. Then they are passed into the Prior Word Extremity Store 36, and extremity values for the subsequent word are stored in New Word Extremity Store 35.

When a new word signal occurs, the new word extremities are compared with the contents of: Prior Word Extremity Store 36; Left Extremity Store 40a; Right Extremity Store 40b; and Bottom Extremity Store 40c, by the New Word Movement Compare Logic 41. Comparisons of these values determine if the new word: follows the preceding word on the same line, starts a new line with no indent, starts a new line with indentation, starts a new line to the left of prior lines, or skips a line. The conditions for these occurrences are as follows:

(a) Skip Line.

Upper extremity of new word more than "t" beneath lower extremity value in Bottom Extremity Store 40c, where "t" is approximately twice line height.

(b) New line, no indent.

Difference between Left Extremity Store 40a contents and left extremity of new word less than "m", and upper extremity of new word is more than "t/4" beneath lower extremity value in Bottom Extremity Store 40c, where "m" is a predetermined constant for determining indentation.

(c) New line, indent.

Difference between Left Extremity Store 40a contents and left extremity of new word less than "−m", and upper extremity of the new word is more than "t/4" beneath lower extremity value in Bottom Extremity Store 40c.

(d) New line, left of margin.

Difference between Left Extremity Store 40a contents and left extremity of the new word more than "m", and upper extremity of the new word is more than "t/4" beneath lower extremity value in Bottom Extremity Store 40c.

(e) Same line, following prior word.

Absolute value of difference between upper extremity of new word and upper extremity value in Prior Word Extremity Store 36 less than "t/4", and left extremity of the new word is greater than right extremity contents of Prior Word Extremity Store 36 by an amount between "m/8" and "m".

(f) New line, no indent, short prior line.

Right extremity value of Prior Word Extremity Store 36 more than "2m" less than right extremity value in Right Extremity Store 40b, the difference between the contents of Left Extremity Store 40a and left extremity of the new word less than "m", and upper extremity of the new word is more than "t/4" beneath lower extremity value in Bottom Extremity Store 40c.

If conditions: (a) skip line; (c) new line, indent; (d) new line, left of margin; or (f) new line, no indent, short prior line; occur and the preceding line was not the beginning of a new paragraph, a new paragraph condition is indicated by the New Paragraph Detector 42. If conditions: (b) new line, no indent; or (c) same line, following prior word; occur New Paragraph Detector 42 is reset and its output indicates an old paragraph condition. New paragraph and old paragraph conditions are passed to the Display Image Position Control Logic 43, where, with new word extremity information, it determines the proper location for each word in the display presentation. As each position is determined it is stored in the Prior Word Position Store 44, where its coordinates are used by Display Image Position Logic 43 to determine the display position of the following word.

Other inputs to the Display Image Position Control Logic 43, include: the line increments for desired separation in the display between left and right margins and for vertical distance between lines; and the display indent increment (if indent is used). These values are set by the choice of display image size and remain constant for a given display geometry. When a new display page image is begun, the first word will be positioned at the left edge of the top line unless the word is designated as the first word of an indented paragraph. If the Display Image Control Logic 43 determines the word should be indented it adds the appropriate displacement to its horizontal position. When subsequent words occur, the Display Image Position Control Logic 43, checks the old or new paragraph status to determine where the words should be positioned. For words in old paragraphs, the Display Image Control Logic 43, determines if the space between the right edge of the prior word and the right margin is large enough to display the new word. If the space is not large enough the word is placed at the left edge of the next line by decrementing the vertical displacement down one line separation, and setting the horizontal displacement at the left margin. If the new word starts a paragraph, the vertical displacement is decremented two line separations, and the horizontal displacement is at the margin or indented from the margin depending on the display format that is chosen by the user.

The minimum x and y coordinates for the display word position are passed to the Display Image Assembly Unit 46, where they are attached to the representation of the word in coordinates X' and Y' from New Word Translate unit 38. These coordinates are passed to Display Word Position Store 47, where they are stored with the same document word sequence number that was assigned for reference in the Tablet Word Position Store 45. The Display Word Position Store 45, also stores new paragraph indications, line increment information, and line indent information with each word that begins a new paragraph. This information is obtained from the Display Image Position Control Logic 43 with the words that begin paragraphs. The Display Word Position Store is the source of data that drives the CRT and places the basic word shapes at the desired location in the image display.

Figure 5:
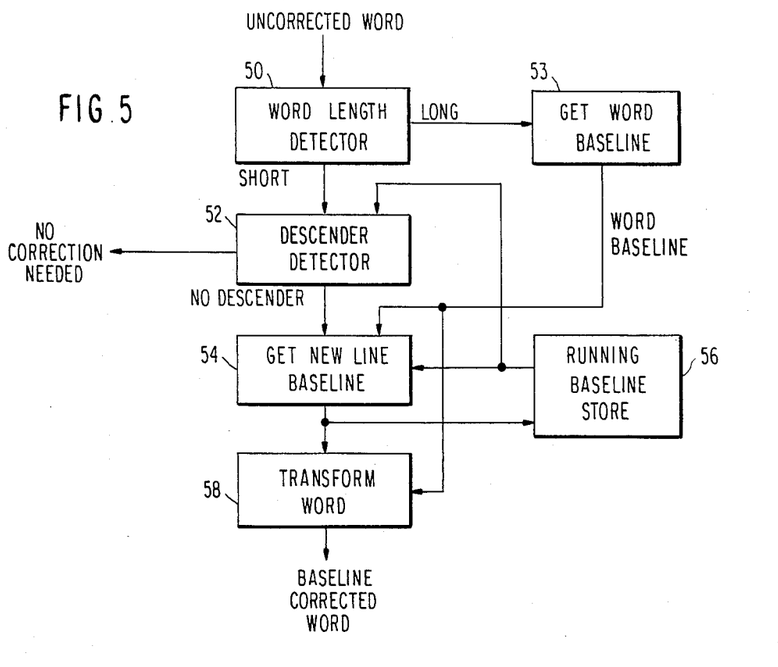
FIG. 5 is a block diagram of the technique for baseline drift correction.

Referring now to FIG. 5, the technique of baseline correction will be explained. A common characteristic of handwritten text is the deviation of words and characters from a nominal baseline. When this occurs, both the appearance and the interpretation of the next may be unacceptable. With the NCI images segmented into words, deviations may be corrected for the purpose of image display and subsequent interpretation. This invention employs a procedure that establishes a left to right sequence of estimates for the Y coordinate of a nominally established baseline. Two levels of baseline correction are accomplished. The first is the correction of the word orientation such that each word becomes horizontal. The second is the correction of the vertical drift such that baselines of the words in one line lie on the same horizontal line. The first is called the baseline slant correction and the second is called the baseline drift correction. In accordance with the present invention, baseline correction is based on the observation that most of the symbols used in a particular alphabet sit on a baseline with only a few exceptions. In the case of the English language, lower case letters "f, g, j, p, q and y" and sometimes "z" have descenders and do not sit on a baseline. Other marks, for purposes of punctuation and the like, such as apostrophes and quotation marks sit above the baseline.

Baseline correction is also a function of word length. When a word is short, for example "a, it, of," the baseline can be assumed to be horizontal, but could be slightly offset from the running baseline of the line being written. Thus, for short words, baseline slant correction is not necessary. Before a new baseline is estimated, it must be determined whether the word is to sit on a baseline. Recall that words with descenders do not sit on a baseline. This is accomplished in the present invention by testing the minimum Y value of the word against the running baseline. If the difference is within a tolerance, for example, approximately 0.33 of the line height, then the word is assumed to sit on a baseline and a new baseline is computed.

A new baseline for a word may be computed by determining the baseline as equaling weight*(running baseline)+(1−weight)*Ymin. In this computation, Ymin is the minimum Y value of the word and the "weight" is a constant approximately 0.5. For conservative correction, the weight may be greater than this value and for more correction the weight will be slightly less.

In reference to word orientation, when the word is long, whether it contains symbols with descenders or not, symbols without descenders sit on a baseline. The method is then to find the baseline and correct it to the horizontal for purposes of display. The methodology is shown in FIG. 5. An uncorrected word is supplied to a word length detector 50. A determination is made of the length of the word based on a predetermined number of characters. If the word length falls above the predetermined minimum number of characters, then it is considered a "long word" and a word baseline is established for that word utilizing a word baseline determinator 53. This is accomplished by drawing boxes of width about the same as a single symbol and high enough to contain all of the points within this particular width. Tall boxes contain ascenders/descenders of the particular alphabet while short boxes contain ligatures. Boxes of medium height contain symbols without ascenders/descenders and those sit on the baseline. A selection is then made of a predetermined number of boxes of medium height and a determination is made by curve fitting of the bottom coordinates to provide baseline slant data. With the slant amount thus calculated, Y coordinates are corrected to make the word horizontal.

Once long words are made horizontal and baselines for all words are detected, words must be moved vertically to match the running baseline of the line under consideration. Thus, the word baseline is supplied to a register 54 of FIG. 5 for the determination of a new baseline.

When a first word of a line is written, there is of course no running baseline. A lined paper or indication by the writer can be used to provide the initial running baseline. Otherwise, the baseline of the first word (the calculation of which is described below) is used initially, and then may be later modified if it was short as more words are written. This is accomplished using the running baseline register 56. An initial value is approximated either from lined paper, user indication, or the baseline of the first word. As new words are written, register 56 is constantly updated as shown in FIG. 5.

In the case of a short word being the first word of the line, an approximation of the initial running baseline is established using the bottom of the word. As shown in FIG. 5, it will be recomputed after succeeding words are written. If a long word is the first word, its baseline becomes the initial running baseline. This initial baseline is not recomputed. Thus, as shown in FIG. 5, based on the estimate of correction of the running baseline, the word is then transformed in register 58 to conform to the running baseline and the baseline corrected word is issued such that it is displayed on the running baseline. As shown in FIG. 5, baseline correction occurs on a word by word basis as the line is established. Baseline correction can also be done at the end of a line. Given processing speeds, a line may be written on the input tablet with display occurring one line at a time with sufficient data obtained such that line by line baseline correction can be attained. It is also possible to postpone display until several lines are generated such that multiple lines can be corrected at once.

While these functions have been described using English language as the input, it will be understood that the invention can be used with other languages. The same methodology would be employed but the values of selected constants would be chosen consistent with word length, characters. etc., of the particular language.

As described herein, a portion of this invention concerns methodology for formatting handwritten characters for display in an organized manner without attempting to recognize the substantive content of those characters. This invention also provides for algorithms used to edit the NCI text. Editing involves changes that move, delete or replace image segments which have been partitioned by the word segmentation operation shown in FIG. 1 and positioned in the display by the operations shown in FIG. 4. The editing operations to be performed can be specified either by touching a menu point on the tablet or by making specific characteristic marks for the action desired. Editing involves several different types of operations and the characteristic mark method would therefore require a machine recognition of different types of marks. Such can be accomplished using well known programming techniques for the input tablet and pen system using pattern recognition techniques.

In addition to techniques for specifying the editing commands to be performed, the system also provides for identification of the segments which are to be operated on, that is the operands. Operands must be identified by pointing to them with the pen, moving a cursor or some other physical technique because the uncoded image segments cannot be identified by their content. Again, known programming techniques for editing using the pen or cursor on the writing tablet accomplish this task. For example, the identification of an NCI word operand can be made by simply pointing to it with a pen or to the space preceding or following it such that a delineation is made of the required operation, that is, delete, insert or move. When the image on the tablet contains the current representation of the image which is to be edited, the user may simply point to the required operand locations with a pen.

However, when the image which was recorded has been stored, operands can be identified by calling up the image on the display screen and pointing with the pen if a touch sensitive display panel is employed. The system logic relating to the position touched on the overlay as corresponding to a position on the document is known in this technology. Direct pointing to the operand provides a natural and fast technique for entering operand information.

Another editing operation for handwritten text is the addition of missing strokes to a word. A common example is the crossing of "t". As long as the word is still found on the input tablet, word completion strokes within the word's proximity zone may be recognized and added to that word for display as a part of the completed word. If, however, the stroke goes beyond the proximity zone, it may cause a situation where neighboring words merge. Word segmentation will still occur after the completion of all strokes.

Another editing technique is to write over a word for purposes of changing that word once it has been written. The invention allows this editing operation to occur by a mode of operation wherein a new stroke can be written over all or part of an existing NCI segmented word to replace all or part of the word which is overwritten. This may be used for operations such as correcting spelling or breaking a long sentence into two with capitalization of the first word of the second sentence.

Another purpose of writing over a recorded word would be to erase it. A characteristic "scratchout" stroke which never occurs in handwriting may be reserved for such word deletion operations. This can be made, for example, by recognizing a stroke on the top of the word where they are written on the tablet so that the word which has been covered by this stroke will be identified and deleted. This would correspond to the common practice of simply crossing words out when they are handwritten.

Figure 6A:
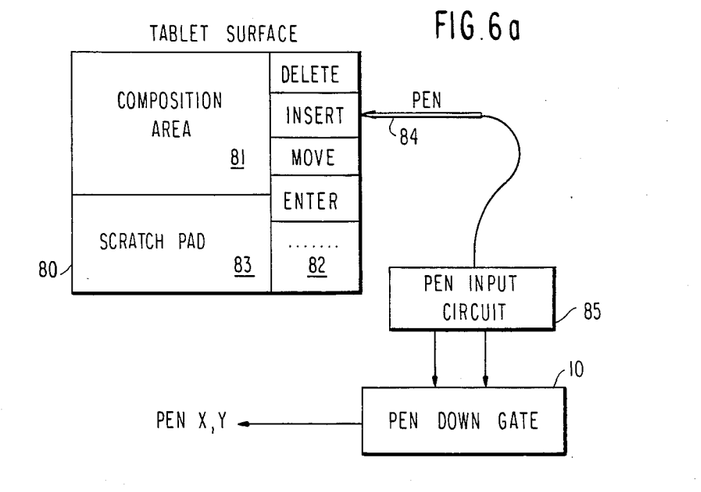
FIGS. 6a and 6b are block diagrams illustrating NCI text editing operations.
Figure 6B:
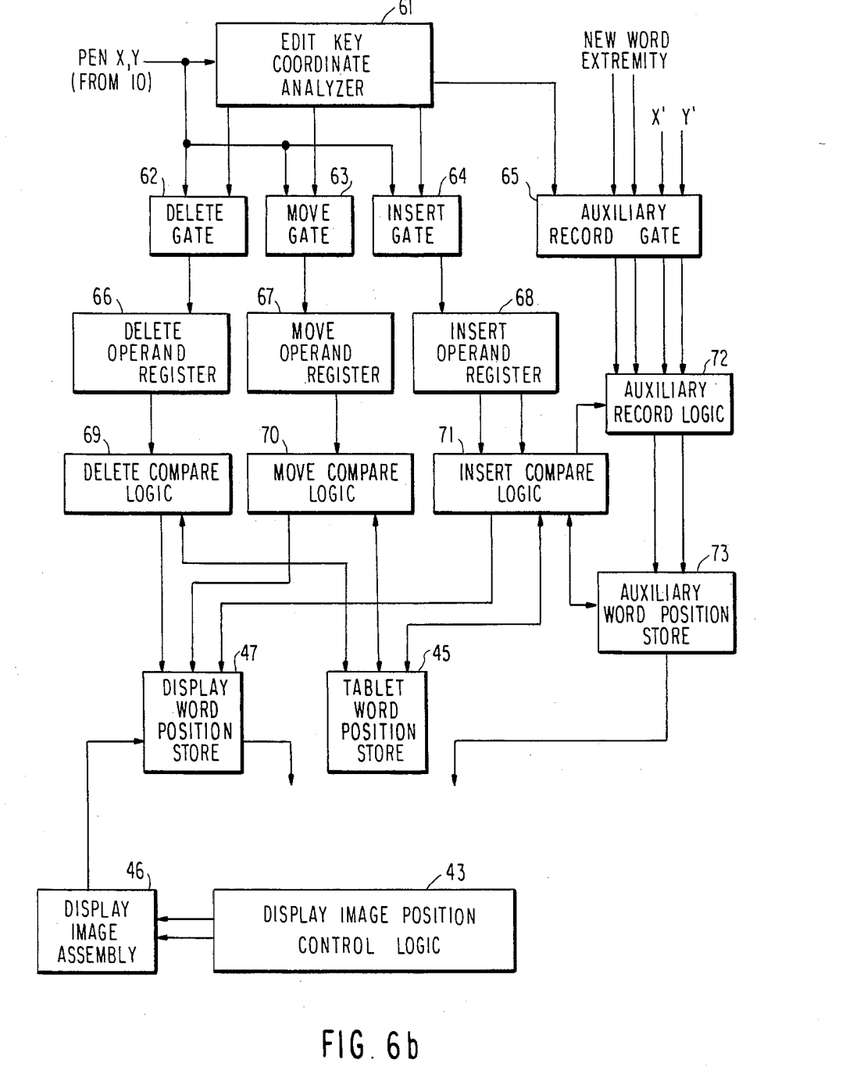

Referring to FIGS. 6a and 6b, the method for three basic NCI text editing operations, delete, insert, and move, are described. In this example the command for each is invoked by touching a "function key" area 82 on the tablet. The coordinates from Pen Down Gate 10, of FIG. 1 are evaluated by Edit Key Coordinate Analyzer 61. If the coordinates match the values for a delete operation, the Delete Gate 62 is enabled and subsequent pen coordinates are directed to the Delete Operand Register 66. The contents of Delete Operand Register 66, are compared with the coordinates stored in Tablet Word Position Store 45, by Delete Compare Logic 69, to determine the document word sequence number(s) of the word(s) to be deleted. The document word sequence number acts as a pointer to the words in the Display Word Position Store 47, that are to be deleted. If the deleted word was the beginning of a paragraph, the new paragraph indicator is passed to the following word. Delete Compare Logic 69 causes the display word positions and the paragraph, indent, and line increment information for the word that precedes the deletion and for the series of words that follow it to pass from Display Word Position Store 47 to the appropriate inputs in FIG. 4 for new word extremities and prior word position in the Word Extremity Detectors 39, New Word Extremity Store 35, Display Image Position Control Logic 43 and Prior Word Display Position Store 44. X' Y' coordinates for each of the words that follow the deletion are passed to the Display Image Assembly Unit 46.

Working in the manner indicated in FIG. 4, Display Image Position Control Logic 43, and the Display Image Assembly Unit 46 record a new display image in Display Word Position Store 47, that does not contain the deleted words.

When the insert command is invoked by touching the insert function key, Insert Gate 64 is enabled by the output of the Edit Key Coordinate Analyzer 61 and the following pen output, corresponding to a touch in the tablet composition area representing the point where the insert is to be made, is recorded in the Insert Operand Register 68. The Insert Compare Logic 71 determines the word sequence numbers associated with the position of the insert in Tablet Word Position Store 45, and thereby identifies the position in the Display Word Position Store 47 where new images will be inserted. After the insert position has been established, a new image is written in the auxiliary Scratch Pad 83 area of Tablet 80. Edit Key Coordinate Analyzer 61 determines that the writing is in the scratch pad area 83 and enables Auxiliary Record Gate 65, to pass the new word extremities from FIG. 1, and the X'Y" coordinates from New Word Translate 38 into Auxiliary Word Position Store 73, under control of Auxiliary Record Logic 72. The auxiliary Record Logic 72 translates the lower left extremity coordinates of the first new word to the values of the insert position in the Display Word Position Store 47, and each subsequent word in the auxiliary record is displaced from that initial location by the amount of its displacement in the scratch pad area. To complete the insert operation, the information for the new words in the Auxiliary Word Position Store 73, are passed to appropriate inputs in FIG. 4 for new word extremities and prior word position, and the Display Image Position Control Logic 43, and the Display Image Assembly Unit 46, position the insertion in Display Word Position Store 47, in the manner indicated in FIG. 4. The words that were behind the insertion position in the Display Position Store 47, before the insertion must be repositioned to follow the end of the inserted words. The Insert Compare Logic 71, translates the lower left extremity coordinates of these words to a position behind the last word of the insertion, and then the modified values for these words in the Display Word Position Store 47, are passed to the Display Image Position Control Logic 43 and Display Image Assembly Unit 46 for repositioning in Display Word Position Store 47.

When the move function key is touched, Move Gate 63 is enabled and coordinates of subsequent touches are collected in Move Operand Register 67. The first pair of touches define the segment of the handwritten page that is to be moved. The coordinates of the third touch define the location where the moved words are to be inserted. The Move Compare Logic 70, determines the word sequence numbers that correspond to these positions by referring to the information stored in Tablet Word Position Store 45. When the move is made, Move Compare Logic 70, translates the lower left extremity of the first word to be moved to the coordinates of the insertion location in Display Word Position Store 47. Each following word to be moved is displaced enough to maintain relative word positions in the Display Word Position Store 47. Non-moved words after the moved words are translated to fill the space and maintain relative position. Move Compare Logic 70, then translates the lower left extremity coordinates of the first word after the insert location to a position just beyond the right extremity of the last word that is moved. All subsequent words are displaced a corresponding amount to retain their relative positions in the Display Word Position Store 47.

Thus, it is apparent that this invention provides for basic tasks of text editing, that is moving and deleting characters together with basic formatting for organization of those characters used for subsequent storage and display.

It is apparent that modifications of this invention may be practiced without departing from the essential scope of the invention. For example, as delineated in FIG. 6a the tablet used for information entry is opaque. In some modes of utilization entry of information is more easily effectuated by using a display overlay. Those modifications of this invention to employ a different data entry technique do not depart from the scope of this invention. It would be understood that in such a scheme the functions of the Display Word Position Store 47 and the Tablet Word Position Store 45 are nearly identical and could be implemented with a single unit.

The tablet organization of FIG. 6a is illustrative of one format. It is apparent that the command functions could be obtained by devices, i.e., keys outside the tablet area. Other configurations are considered to be within the purview of this invention.

Having thus described our invention, what we claim as new, and desire to secure by Letters Patent is:

1. A data input and display system comprising:
x-y tablet means having an input stylus for inputting a handwritten image comprising a series of words and converting into coordinate signals as said words are input;
display means to portray said handwritten image on a display screen; and
means for formatting said handwritten image as it is input prior to display to modify said handwritten image in accordance with predetermined rules thereby uniformly separating and aligning word portions of said handwritten image with our word portions, and comprising means for completing a line of said handwritten image with succeeding words; and
means for determining when a word begins a new paragraph and for either indenting or outdenting said word on a new line or skipping a line and beginning a new sentence with that word, said means for determining comprising,
detector means for determining, based on coordinate signals, extremity positions of new words as they are input to said X-Y tablet, extremity store means to store extremity values representing maximum left, right and bottom positions of input words;
means to store extremity values of a prior input word; and
comparison means for determining whether an input word follows a preceding word on the same line, starts a new line without indenting, skips a line or starts a new line horizontally displaced with respect to prior lines.

2. The system of claim 1 wherein said means for formatting further comprises means for segmenting one word of said handwritten image from another word of said handwritten image.

3. The system of claim 2 wherein said means for segmenting comprise register means to store extremities of strokes during a period of time when said stylus is in contact with said tablet, comparator means to determine whether a succeeding stroke exceeds the stored stroke extremity positions by a predetermined amount, and means to determine whether a succeeding stroke exceeds a predetermined zone of proximity that exceeds said stored extremity positions to determine whether a succeeding stroke is a continuation of a handwritten word or the beginning of a succeeding word.

4. The system of claim 1 wherein said comparison means comprises logic means for comparing upper extremity value of an input word with said stored maximum bottom extremity value, said logic means producing an output for skipping a line when said upper extremity value exceeds said stored bottom extremity value by more than a predetermined amount.

5. The system of claim 1 wherein said comparison means comprises logic means for comparing the difference between a stored left maximum extremity value and a left extremity value of an input word, said logic means producing an output for beginning a new line without indentation when said comparison is less than a predetermined value.

6. The system of claim 1 wherein said comparison means comprises logic means for comparing an upper extremity value of an input word with a stored upper extremity value of a prior word; said logic means producing an output for placing an input word on the same line as said preceding word when said comparison results are then a predetermined value and the left extremity of the input word is greater than the stored right extremity of said prior word by a predetermined amount.

7. The system of claim 1 wherein said comparison means comprises a new paragraph detector to determine whether an input word is the first word of a new paragraph.

8. The system of claim 1 wherein said means for formatting further comprises means for aligning said handwritten image on parallel horizontal lines.

9. The system of claim 8 wherein said means for aligning comprises first means for orienting an input word to be horizontal with respect to a predetermined horizontal orientation, and second means for aligning horizontal words on a common horizontal line.

10. The system of claim 9 wherein said first means comprises a word length detector for determining whether an input word is longer than a predetermined length and a word baseline determinator for establishing a baseline for words exceeds said predetermined length.

11. The system of claim 10 wherein said second means comprises a first register for storing baselines of input words from said baseline determinator, and a second register storing a running baseline updated by baselines stored in said first registers, and means to move an input word so that it conforms to said running baseline.

12. The system of claim 8 wherein said means for aligning said handwritten image comprises a word length detector receiving an input handwritten image, means to determine whether said word of said handwritten image contains any descender characters, a register to store a running baseline representative of the horizontal alignment of words of said handwritten image, means to establish the word baseline of the input handwritten image, means responsive to said running baseline, descender information and the word baseline to correct the running baseline as a function of the word baseline and, means to transform the position of said input handwritten image as a junction of the corrected running baseline.

13. The system of claim 1 further comprising means to edit said handwritten image.

14. The system of claim 13 wherein said X-Y tablet comprises an interactive zone responsive to said input stylus for generating edit commands to said means for formatting and a zone for entering replacement words.

15. The system of claim 13 wherein said means to edit comprises edit coordinate analyzer means for determining the functional command to be performed, means for storing an operand of said functional command to be performed, logic means for performing said operand and means for storing the edited image.

16. The system of claim 15 wherein said means to edit comprises means to shift segmented words of said handwritten image into locations on said display means that are positionally different from the position of input on said x-y tablet.

17. The system of claim 15 wherein said means to edit comprises means to delete portions of said handwritten image.

* * * * *